United States Patent [19]

Kawamura et al.

[11] Patent Number: 5,590,231

[45] Date of Patent: Dec. 31, 1996

[54] FERRULE

[75] Inventors: Shigeto Kawamura; Takehiko Yamamura, both of Yokkaichi, Japan

[73] Assignee: Sumitomo Wiring Systems, Ltd., Japan

[21] Appl. No.: 346,021

[22] Filed: Nov. 29, 1994

[30] Foreign Application Priority Data

Jan. 24, 1994 [JP] Japan ................... 6-023283

[51] Int. Cl.⁶ .................................................. G02B 6/36
[52] U.S. Cl. ............................................................ 385/78
[58] Field of Search .................. 16/108, 109; 174/74 R; 439/874, 936, 597, 598; 385/78

[56] References Cited

U.S. PATENT DOCUMENTS

| | | | |
|---|---|---|---|
| 1,911,406 | 5/1933 | Tevander | 16/109 |
| 3,372,476 | 5/1968 | Peiffer | 439/874 |
| 4,135,781 | 1/1979 | Archer | 385/78 |
| 4,191,447 | 3/1980 | Borsuk | 385/78 |
| 4,510,005 | 4/1985 | Nijman . | |
| 4,695,124 | 9/1987 | Himono et al. | 385/78 |
| 5,018,821 | 5/1991 | Kurata . | |
| 5,071,218 | 12/1991 | Nishimoto | 385/78 |
| 5,113,476 | 5/1992 | Okada et al. | 385/78 |

FOREIGN PATENT DOCUMENTS

| | | | |
|---|---|---|---|
| 60-186812 | 9/1985 | Japan | 385/78 |
| 63-127865 | 5/1988 | Japan . | |
| 63-104005 | 5/1988 | Japan | 385/78 |
| 63-316005 | 12/1988 | Japan | 385/78 |

OTHER PUBLICATIONS

European Search Report EP 94 12 0014.

*Primary Examiner*—M. Rachuba
*Assistant Examiner*—Donald M. Gurley
*Attorney, Agent, or Firm*—Bierman and Muserlian

[57] ABSTRACT

There is disclosed a ferrule including a sheath holding portion (11) and a core wire holding portion (12) which have inner diameters slightly greater than the outer diameters of a sheath portion (a) and a core wire portion (b) of a plastic fiber (A), respectively. The sheath holding portion (11) is provided with a flange portion (11a) which contacts a coiled spring when mounted in a connector housing, and the core wire holding portion (12) includes a large-diameter portion (13) at a front end thereof for receiving a front end portion of the core wire portion (b) of the plastic fiber (A) softened by hot plate treatment. The large-diameter potion (13) has a tapered inner surface such that an inner diameter thereof increases toward the front end, and the angle of flare thereof is 30 degrees.

4 Claims, 4 Drawing Sheets

FERRULE

BACKGROUND OF THE INVENTION

1. Field of the Invention

The present invention relates to a ferrule for a plastic fiber and, more particularly, to a ferrule for use in hot plate treatment.

2. Description of the Prior Art

The thermal shock test (at a temperature from −40° to 85° C., for about 30 minutes) of a plastic fiber fitted in a ferrule has caused an end surface of the fiber to sink inwardly from an end of the ferrule because of shrinkage of the plastic fiber itself. The exact cause of the shrinkage of the fiber has not yet been clear. However, the shrinkage is considered to occur by the application of heat to a core/cladding (core wire) distorted due to heating and stretching when fabricated. Another cause of the shrinkage is different thermal expansion coefficients of the ferrule, a sheath material, and the core/cladding.

To prevent the fiber end surface from sinking, the plastic fiber has been fixed to the ferrule with an adhesive, and a front end of the plastic fiber has been melted down by means of a hot plate, which is known as hot plate treatment, so that the fiber end engages a front end portion of the ferrule for prevention of falling off.

For the hot plate treatment, a large-diameter portion 51 at a front end of a ferrule 50 and having an inner diameter greater than that of the ferrule 50 is required as a space for filling therein the plastic fiber melted and softened by means of the hot plate as shown in FIGS. 5A to 5C. The large-diameter portion 51 is basically of a rectangular cross-sectional configuration as shown in FIG. 5A. For relaxation of stresses to be applied during shrinkage, the large-diameter portion 51 has, in cross section, a rounded corner as shown in FIG. 5B and a chamfered corner as shown in FIG. 5C.

In the above stated hot plate treatment, a high-heat-resistant plastic fiber which is less susceptible to changes than general plastic fibers in hardness of the fiber at high temperatures is subjected to stress concentration on a portion of the fiber which is filled in the large-diameter portion of the ferrule due to fiber shrinkage. In particular, the thermal shock test has caused cracks in the stress concentrated portion.

In the plastic fiber fixed to the ferrule with an adhesive, the end surface of the fiber has not sunk inwardly from the end of the ferrule and no cracks have been generated, but it has been necessary to wait until the adhesive dries, resulting in poor productivity.

SUMMARY OF THE INVENTION

According to the present invention, a ferrule comprises: a tubular core wire holding portion for receiving and holding a core wire portion of a plastic fiber; and a tubular sheath holding portion for receiving and holding a sheath portion of the plastic fiber, the core wire holding portion including a large-diameter portion at a front end thereof having a tapered inner surface such that an inner diameter thereof increases toward the front end, wherein an angle at which the tapered inner surface is flared is not more than 30 degrees.

According to the ferrule of the present invention, the tapered inner surface of the large-diameter portion receiving the front end of the fiber softened by the hot plate treatment is flared at the angle of not more than 30 degrees. Thus, if the fiber shrinks by the thermal shock test and the like, an end surface of the fiber is prevented from sinking inwardly from the end of the ferrule. Further, since stresses are not concentrated on the front end of the fiber, the generation of cracks is prevented.

Preferably, the angle at which the tapered inner surface is flared is not less than 15 degrees.

In particular, the angle of flare is preferably in the range from 15 to 30 degrees since it does not necessitate the increase in depth of the large-diameter portion.

It is therefore an object of the present invention to provide a ferrule which prevents an end surface of a fiber from sinking inwardly from an end of the ferrule due to a thermal shock test and which can relax stresses concentrated on a front end of the fiber filled in a large-diameter portion if hot plate treatment is carried out.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
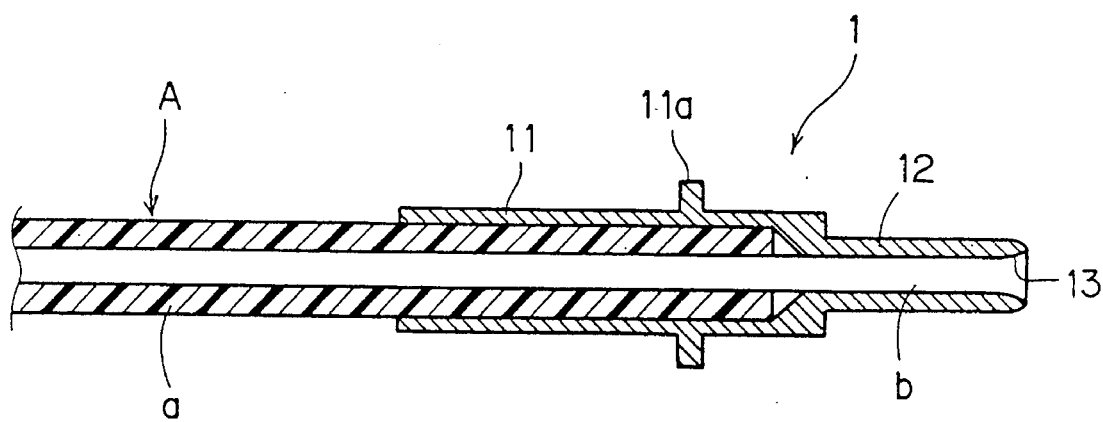
FIG. 1 is a sectional view of a preferred embodiment according to the present invention.
Figure 2A:
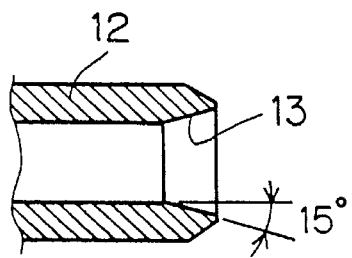
FIGS. 2A to 2D are sectional views showing configurations of a large-diameter portion of each ferrule used in an experiment.
Figure 2B:
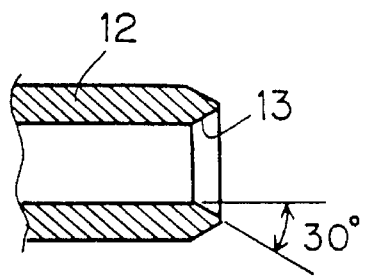
Figure 2C:
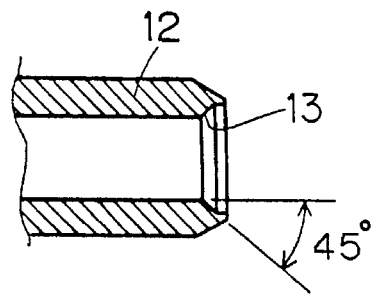
Figure 2D:
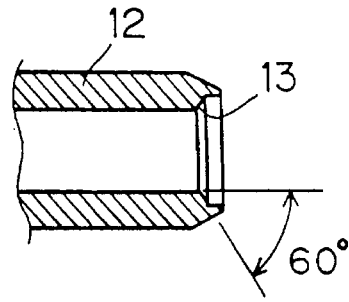

A preferred embodiment of the present invention will now be described with reference to the drawings. Referring to FIG. 1, a ferrule 1 comprises a sheath holding portion 11 for holding a sheath portion a of a plastic fiber A and a core wire holding portion 12 for holding a core wire portion b of the plastic fiber A. The ferrule 1 is mounted in a connector housing and the like when in use.

The sheath holding portion 11 and the core wire holding portion 12 have inner diameters slightly greater than the outer diameters of the sheath portion a and core wire portion b of the plastic fiber A, respectively. The sheath holding portion 11 is provided with a flange portion 11a which contacts a coiled spring when the ferrule 1 is mounted in the connector housing.

A large-diameter portion 13 is provided at a front end of the core wire holding portion 12 and receives a front end portion of the core wire portion b of the plastic fiber A softened by hot plate treatment. The large-diameter portion 13 has a tapered inner surface such that an inner diameter thereof increases toward the front end. The angle of flare of the large-diameter portion 13 is 15 degrees.

The greater the angle of flare of the tapered inner surface of the large-diameter portion 13 is, the more effectively an end surface of the fiber is prevented from sinking inwardly from an end of the ferrule due to shrinkage of the fiber. However, as the angle of flare increases, stress concentration on the front end of the fiber increases. Thus, the angle of flare is preferably not more than 30 degrees. On the other hand, when the angle of flare is very small, a need arises to increase the depth of the large-diameter portion 13 to prevent the fiber end surface from sinking, resulting in reduction in the amount of light to be transmitted. Therefore, the angle of flare is ideally preferably in the range from 15 to 30 degrees.

Figure 4:
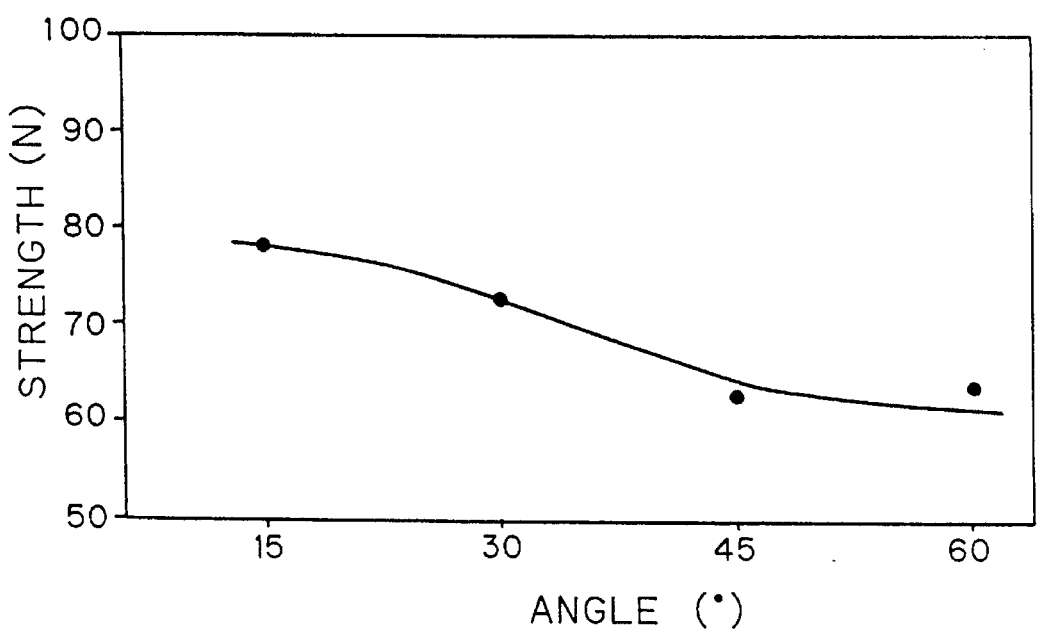
FIG. 4 is a graph showing the strength of a fiber at front end versus the angle of flare of the large-diameter portion.
Figure 5A:
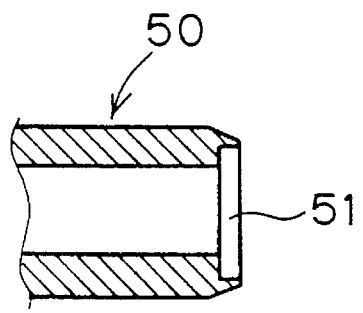
FIGS. 5A to 5C are sectional views of the prior art.
Figure 5B:
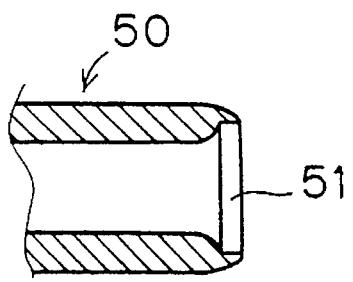
Figure 5C:
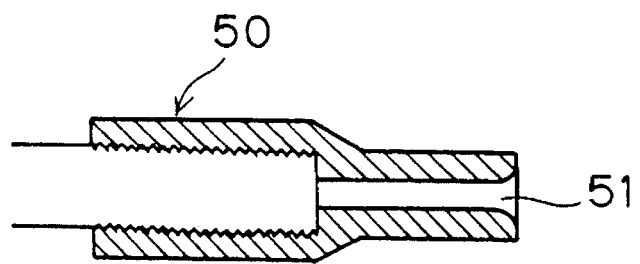

Referring to FIGS. 2A to 2D, the plastic fiber A with the ferrule 1 is subjected to the hot plate treatment and checked for the strength of the fiber at front end and for cracks due to the thermal shock test when the angle of flare of the tapered inner surface of the large-diameter portion 13 is 15 degrees, 30 degrees, 45 degrees, and 60 degrees. The results are shown in Table 1 and FIG. 4. The dimensions of the ferrule used in this experiment are as follows: the diameter D of the ferrule is 2 mm; the maximum aperture diameter d of the large-diameter portion 13 is 1.4 mm; and the diameter of the fiber $\phi$ is 1 mm.

TABLE 1

| angle | 100 cycles | 250 cycles | 500 cycles | 750 cycles | 1000 cycles |
|---|---|---|---|---|---|
| 15° | o | o | o | o | o |
| 30° | o | o | o | x | |
| 45° | o | x | | | |
| 60° | o | x | | | | where the open circle represents the absence of cracks, and the cross represents the generation of cracks.

Figure 3:
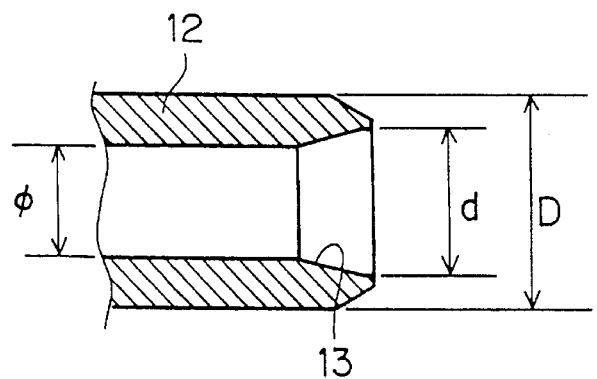
FIG. 3 is a sectional view showing dimensions of the large-diameter portion of the ferrule used in the experiment.

It will be apparent from Table 1 and FIG. 3 that as the angle of flare decreases, the strength of the fiber at front end increases and the likelihood of crack generation due to the thermal shock test decreases.

While the invention has been shown and described in detail, the foregoing description is in all aspects illustrative and not restrictive. It is therefore understood that numerous modifications and variations can be devised without departing from the scope of the invention.

What is claimed is:

1. A ferrule comprising:

a tubular core wire holding portion for receiving and holding a core wire portion of a plastic optical fiber; and a tubular sheath holding portion for receiving and holding a sheath portion of said plastic fiber, said core wire holding portion including a large-diameter portion at a front end thereof having a tapered inner surface such that an inner diameter thereof increases toward the front end, wherein an angle at which said tapered inner surface is flared is not more than 3 degrees.

2. The ferrule of claim 1, wherein said angle at which said tapered inner surface is flared is not less than 15 degrees.

3. The ferrule of claim 1 wherein said plastic optical fiber will shrink or crack when subjected to heat.

4. The ferrule of claim 3 wherein said angle is at least 15°.

* * * * *